Patented Jan. 8, 1952

2,581,387

UNITED STATES PATENT OFFICE 2,581,387

HIGH MOLAL AMINE QUATERNARY AMMONIUM DERIVATIVES OF ALPHA-HALOGEN CARBOXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948, Serial No. 65,091

8 Claims. (Cl. 260—53)

This invention is concerned with certain new chemical products, compounds or compositions which have useful application in various arts. This invention is a continuation-in-part of our copending application Serial No. 726,210, filed February 3, 1947 and now abandoned. It includes methods or procedures for manufacturing said new chemical products, compounds, or compositions, as well as the products, compounds, or compositions themselves. Said new compounds or compositions are quaternary compounds obtained by reaction between a dimethylated aliphatic amine in which the aliphatic radical has at least 10 and not more than 22 carbon atoms and the ester of an alpha-halogen monocarboxylic acid having not over 6 carbon atoms and hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

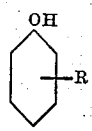

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 65,090, filed December 13, 1948, now Patent 2,542,005, granted February 20, 1951. The new products are useful as wetting, detergent, and leveling agents in the laundry, textile and dyeing industries; as wetting agents and spreaders in the application of asphalt in road building and the like; as flotation reagents in the flotation separation of various aqueous suspensions containing negatively charged particles, such as sewage, coal washing waste water, and various trade wastes and the like; as germicides, insecticides; emulsifying agents, as, for example, for cosmetics, spray oils, water-repellent textile finishes; as lubricants, etc.

The esters of alpha-halogen monocarboxy acids with oxyalkylated phenol-aldehyde resins which are converted to the quaternary ammonium compounds of the invention are described in our Patent 2,542,005, granted February 20, 1951. The phenol-aldehyde resins and their oxyalkylation are described in our Patent 2,499,370, granted March 7, 1950. Reference is made to these patents for a description of the phenol-aldehyde resins used, their oxyalkylation and their conversion to alpha-halogen monocarboxy acid esters. For examples of phenol-aldehyde resins, reference is made to Examples 1a through 103a of Patent 2,499,370. For examples of the oxyalkylated resins, reference is made to tables in columns 31 through 46 of Patent 2,542,005. For examples of the alpha-halogen monocarboxy acid esters of these oxyalkylated resins, reference is made to Examples 1c through 39c of Patent 2,542,005.

Having obtained a suitable chloroacetate or the like, such ester can then be reacted with amines of the formula $(CH_3)_2NR$ in which R is an aliphatic radical having 10 to 22 carbon atoms.

Such amines include dimethyldodecylamine, dimethylhexadecylamine, dimethyloctadecenylamine, etc. Such amines are available from various sources, and some of the most desirable ones are available from sources such as the Onyx Oil & Chemical Company, Jersey City, New Jersey. Others can be prepared by purchasing the primary higher fatty acid amines from the Armour Chemical Division, Armour & Company, Chicago, Illinois, and replacing the hydrogen atoms by methyl radicals. A partial list of such available primary amines appears in our co-pending application Serial No. 65,089, and filed December 13, 1948.

It is to be noted that, in addition to the amines previously described, certain other amines are of such close structure that they would serve just as satisfactorily. One example is an amine obtained by treating mono- or dialkylated phenol, particularly butylphenol, amylphenol, octylphenol, dibutylphenol, dioctylphenol, or the like, with one or more moles of ethylene oxide, and then converting the terminal hydroxyl group into a chlorine group and reacting the chloride with ammonia so as to give the primary amine, which is subsequently methylated so as to yield a tertiary amine having two methyl groups. An amine of this type which is commercially available is octylphenoxyethoxyethyldimethylamine. The quaternary ammonium compounds obtained from this particular type of tertiary dimethylated amine act the same as quaternary compounds derived from the equivalent higher fatty acid type of amine, such as cetyldimethylamine, octadecyldimethylamine, hexadecyldimethylamine, dodecyldimethylamine, decyldimethylamine, octadecenyldimethylamine, etc.

Example 1d 400 grams of the xylene-containing alphachloro acid ester identified as 8c of Patent 2,542,005 were mixed with an equimolar amount, to wit, 67 grams of cetyldimethylamine. To the ester-tertiary amine mixture there was added an amount of xylene equal in weight to about 25% of the tertiary amine. In the instant case this was 15 grams. A little xylene was lost during the subsequent reflux period. The experiments were conducted so that in the majority of cases the final product contained approximately 40% xylene. If desired, this xylene could be eliminated by evaporation or vacuum distillation. In the use of the products for demulsification, it is convenient to have the xylene present so as to give a non-viscous liquid which can be handled easily.

The two reactants were refluxed at the boiling point of xylene (140° C.) for 2 to 4 hours. Tests in this kind of reaction have invariably indicated that the reaction is complete in less than 2 hours and sometimes in as little as 30 minutes. However, by way of precaution in this experiment and in subsequent experiments, such time range of 2 to 4 hours was employed. The final product, without eliminating the xylene, was a deep amber-colored, non-viscous liquid, which formed a cloudy solution in water, and contained 44.5% xylene.

Example 2d

The procedure employed was the same as that in Example 1d, except that 400 grams of the ester identified as 3c of Patent 2,542,005 were reacted with 57 grams of cetyldimethylamine. The final product contained 42.5% xylene. The xylene-containing solution was a non-viscous, deep amber-colored liquid, that was readily water-soluble.

Example 3d

The procedure employed was the same as that in Example 1d, except that 400 grams of the ester identified as 4c of Patent 2,542,005 were reacted with 62 grams of cetyldimethylamine. The final product contained 40.5% xylene. The xylene-containing solution was a very viscous, deep amber-colored liquid, that was not readily water-soluble.

Example 4d

The procedure employed was the same as that in Example 1d, except that 400 grams of the ester identified as 5c of Patent 2,542,005 were reacted with 52 grams of cetyldimethylamine. The final product contained 40.8% xylene. The xylene-containing solution was a non-viscous, deep amber-colored liquid, which was water-soluble with slight turbidity.

Example 5d

The procedure employed was the same as that in Example 1d, except that 400 grams of the ester identified as 23c of Patent 2,542,005 were reacted with 77 grams of cetyldimethylamine. The final product contained 39.8% xylene. The xylene-containing solution was a non-viscous, deep amber-colored, water-soluble liquid.

Example 6d

The procedure employed was the same as that in Example 1d, except that 400 grams of the ester identified as 24c of Patent 2,542,005 were reacted with 65 grams of cetyldimethylamine. The final product contained 40.5% xylene. The xylene-containing solution was a non-viscous, deep amber-colored, water-soluble liquid.

Example 7d

The procedure employed was the same as that in Example 1d, except that 400 grams of the ester identified as 25c of Patent 2,542,005 were reacted with 50 grams of cetyldimethylamine. The final product contained 39.4% xylene. The xylene-containing solution was a somewhat viscous, deep amber-colored liquid, water-soluble but forming a cloudy solution.

Example 8d

The procedure employed was the same as that in Example 1d, except that 500 grams of the ester identified as 10c of Patent 2,542,005 were reacted with 54 grams of cetyldimethylamine. The final product contained 36.6% xylene. The xylene-containing solution was a very viscous, deep amber-colored, almost solid mass.

Example 9d

The procedure employed was the same as that in Example 1d, except that 500 grams of the ester identified as 15c of Patent 2,542,005 were reacted with 64 grams of octadecenyldimethylamine. The product contained 38.9% xylene and was a very viscous, dark-amber liquid, giving a somewhat cloudy solution.

Example 10d

The procedure employed was the same as that in Example 1d, except that 500 grams of the ester identified as 13c of Patent 2,542,005 were reacted with 66 grams of dodecyldimethylamine. The product contained 45.3% xylene and was a viscous, dark amber liquid, giving a somewhat cloudy solution.

Example 11d

The procedure employed was the same as that in Example 1d, except that 500 grams of the ester identified as 14c of Patent 2,542,005 were reacted with 82 grams of octaphenoxyethoxyethyl dimethylamine. The product contained 40.6% xylene and was a viscous, dark amber liquid, giving a somewhat cloudy solution.

Example 12d

The procedure employed was the same as that in Example 1d, except that 250 grams of the ester identified as 8c of Patent 2,542,005 were reacted with 42 grams of cetyldimethylamine. The product contained 42.8% xylene and was a viscous, dark amber liquid, giving a somewhat cloudy solution.

Example 13d

The procedure employed was the same as that in Example 1d, except that 250 grams of the ester identified as 9c of Patent 2,542,005 were reacted with 37 grams of octadecenyldimethylamine. The product contained 40.6% xylene and was a viscous, dark amber, partly solid mass, giving a clear solution.

Example 14d

The procedure employed was the same as that in Example 1d, except that 250 grams of the ester identified as 12c of Patent 2,542,005 were reacted with 57 grams of octaphenoxyethoxyethyldimethylamine. The product contained 47.0% xylene and was a viscous, dark amber liquid, giving a cloudy solution.

Example 15d

The procedure employed was the same as that in Example 1d, except that 250 grams of the ester identified as 20c of Patent 2,542,005 were reacted with 23 grams of dodecyldimethylamine. The product contained 38.2% xylene and was a very viscous, dark amber liquid, giving a cloudy solution.

Having thus described our invention, what we claim as new and desire to secure by Letters Patent is:

1. A quaternary ammonium compound obtained by reaction between a dimethylated higher aliphatic amine in which the aliphatic radical has at least 10 and not more than 22 carbon atoms, and an ester in which the acyl radical is that of an alpha-halogen monocarboxylic acid having not over 6 carbon atoms and composed of carbon, hydrogen, oxygen and halogen, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

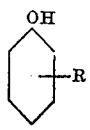

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A quaternary ammonium compound obtained by reaction between a dimethylated higher aliphatic amine in which the aliphatic radical has at least 10 and not more than 22 carbon atoms, and a chloroacetate of certain hydrophile synthetic products; a said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

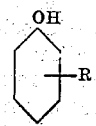

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals and hydroxybutylene radicals, and $n$ is a numeral varying from 1 to 20; with the proviso that at least 2 moles of alkylene oxide be introduced for each phenolic nucleus; and with the final proviso that the hydrophile properties of the ultimate quaternary ammonium compound as well as the oxyalkylated resin in an equal weight of xylene are sufficient to produce an emulsion when said xylene solution is shaken vigorously with one to three volumes of water.

3. A quaternary ammonium compound obtained by reaction between a dimethylated higher aliphatic amine in which the aliphatic radical has at least 10 and not more than 22 carbon atoms, and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

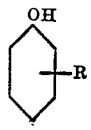

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

4. A quaternary ammonium compound obtained by reaction between a dimethylated higher aliphatic amine in which the aliphatic radical has at least 10 and not more than 22 carbon atoms, and a chloroacetate of certain hydrophile synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

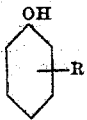

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,499,365 | De Groote | Mar. 7, 1950 |